(12) United States Patent
Hayakawa (10) Patent No.: US 6,860,357 B2
(45) Date of Patent: Mar. 1, 2005

(54) MOTOR VEHICLE THAT ACQUIRES DRIVING POWER FOR RUNNING FROM HIGH VOLTAGE POWER SUPPLY

(75) Inventor: Hiroyuki Hayakawa, Nagoya (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 64 days.

(21) Appl. No.: 10/150,764

(22) Filed: May 17, 2002

(65) Prior Publication Data

US 2002/0195290 A1 Dec. 26, 2002

(30) Foreign Application Priority Data

| May 18, 2001 | (JP) | ................................. 2001-148851 |
| Jun. 19, 2001 | (JP) | ................................. 2001-185495 |
| Jun. 25, 2001 | (JP) | ................................. 2001-191029 |

(51) Int. Cl.[7] ............................................. B60T 7/12
(52) U.S. Cl. ........................... 180/277; 180/279; 180/282
(58) Field of Search .......................... 180/277, 279, 180/282

(56) References Cited

U.S. PATENT DOCUMENTS

| 4,641,041 A | * | 2/1987 | Mattes et al. ................ 340/438 |
| 4,705,136 A | * | 11/1987 | Godsoe, Sr. et al. ......... 180/277 |
| 4,934,478 A | * | 6/1990 | Melocik et al. .............. 180/275 |
| 4,950,915 A | * | 8/1990 | Spies et al. .................. 307/10.1 |
| 4,958,851 A | * | 9/1990 | Behr et al. ................... 280/735 |
| 4,967,862 A | * | 11/1990 | Pong et al. ................... 180/19.3 |
| 5,036,935 A | * | 8/1991 | Kohara ......................... 180/168 |
| 5,387,819 A | * | 2/1995 | Ueno et al. ................... 307/10.1 |
| 5,424,583 A | * | 6/1995 | Spies et al. .................. 307/10.1 |
| 5,440,913 A | * | 8/1995 | Crispin et al. ................ 73/1.38 |
| 5,462,439 A | * | 10/1995 | Keith ............................ 439/34 |
| 5,577,569 A | * | 11/1996 | Nakashima ................... 180/169 |
| 5,793,121 A | * | 8/1998 | Burgess ....................... 307/10.1 |
| 5,816,358 A | * | 10/1998 | Adler et al. .................. 180/279 |
| 5,877,563 A | * | 3/1999 | Krappel et al. .............. 307/10.1 |
| 6,036,224 A | * | 3/2000 | Wachter et al. .............. 280/735 |
| 6,196,580 B1 | * | 3/2001 | Eberle et al. ................. 280/735 |
| 6,234,520 B1 | * | 5/2001 | Breed et al. .................. 280/734 |
| 6,256,563 B1 | * | 7/2001 | Blank et al. .................. 701/45 |
| 6,325,171 B1 | * | 12/2001 | Masunari et al. ............ 180/279 |
| 6,371,000 B1 | * | 4/2002 | Hutmacher et al. .......... 89/1.11 |
| 6,411,190 B1 | * | 6/2002 | Yamaguchi et al. ......... 337/401 |
| 6,448,884 B1 | * | 9/2002 | Yamaguchi et al. ......... 337/401 |
| 6,591,924 B2 | * | 7/2003 | Shimizu ........................ 180/65.1 |
| 6,640,174 B2 | * | 10/2003 | Schondorf et al. ........... 701/45 |
| 6,668,963 B2 | * | 12/2003 | Nada ............................. 180/279 |

* cited by examiner

Primary Examiner—Eileen D. Lillis
Assistant Examiner—Rashmi Sharma
(74) Attorney, Agent, or Firm—Rossi, Kimms & McDowell (57) ABSTRACT

A motor vehicle acquires driving power for running from a high voltage power supply. The vehicle has a collision detecting device that detects a vehicle collision, a deceleration detecting device that detects a deceleration of the motor vehicle, and a high voltage system shut-off control device that provides control such that a circuit of the high voltage power supply is broken in response to a collision detection signal from the collision detecting device. The circuit of the high voltage power supply is reconnected when the deceleration detected by the deceleration detecting device does not become equal to or greater than a predetermined value within a short period of time from the receipt of the collision detection signal. Therefore, if the vehicle has collided, the power supply is shut off immediately, and if the vehicle has not really collided, the power supply is not shut off so as to surely enable the vehicle to run.

9 Claims, 9 Drawing Sheets

MOTOR VEHICLE THAT ACQUIRES DRIVING POWER FOR RUNNING FROM HIGH VOLTAGE POWER SUPPLY

This no-provisional application claims priority under 35 U.S.C. §119(a) on patent application Ser. No. 2001-148851 filed in Japan on May 18, 2001, patent application Ser. No. 2001-185495 filed in Japan on Jun. 19, 2001, and patent application Ser. No. 2001-191029 filed in Japan on Jun. 25, 2001, which are herein incorporated by reference.

BACKGROUND OF THE INVENTION

1. Field of the Invention

This invention relates to a motor vehicle such as an electric vehicle that acquires driving power for running from a high voltage power supply and includes a high voltage system shut-off device that shuts off a high voltage electric system in case of emergency.

2. Description of the Related Art

An electric vehicle acquires driving power for running from a power supply of a considerably higher voltage (several hundred volt) than a battery (usually 12 bolt) installed in a normal motor vehicle. Thus, the electric vehicle is required to take measures to prevent leakage of a high voltage power supply in case of emergency, and accordingly, a variety of techniques have been proposed.

For example, Japanese Laid-Open Utility Model Publication (Kokai) No. 61-202101 has disclosed an electric vehicle that is capable of shutting off the flow of electric current from a power supply to a drive unit upon detection of a collision.

Further, Japanese Laid-Open Patent Publication (Kokai) No. 09-284901 has disclosed the technique of disconnecting batteries from an electric vehicle to prevent leakage of a high voltage, and reconnecting the batteries to the electric vehicle if the vehicle is only slightly damaged.

A sensor for detecting a collision of a vehicle, however, determines whether the vehicle has collided or not according to impact applied to the sensor itself, and therefore, the sensor may determine that the vehicle has collided even in a case where the vehicle has not really collided. In this case, even through the vehicle is able to continue running, the flow of electric current from a power supply is shut off to stop a drive unit for running the vehicle. This disenables the vehicle to run, and therefore, the vehicle stops on the moment.

Moreover, if a sensor for detecting a collision of the vehicle and an electric circuit thereof have failed, the flow of electric current from the power supply to a drive unit is controlled according to false information, and even if the vehicle has not really collided, the flow of electric current from the power supply to the drive may be shut off to disenable the vehicle to run.

SUMMARY OF THE INVENTION

It is therefore an object of the present invention to provide a motor vehicle such as an electric vehicle, which acquires driving power for running from a high voltage power supply and includes a high voltage system shut-off apparatus, which promptly shuts off the power supply if the vehicle has collided, and surely enable the vehicle to run without shutting off the power supply if the vehicle has not collided.

To attain the above object, the present invention provides a motor vehicle that acquires driving power for running from a high voltage power supply, comprising: a feeding circuit breaking and connecting device that is provided in a feeding circuit, connecting a power supply to a motor, to break and connect the feeding circuit; a collision detecting device that is provided in the motor vehicle to detect a collision of the motor vehicle; a feeding circuit control device that is responsive to a collision detection signal from the collision detecting device, for controlling breaking of the feeding circuit by the feeding circuit breaking and connecting device; and an inhibiting device that is provided in the motor vehicle to detect an operating condition of the motor vehicle and inhibit the feeding control device from operating.

BRIEF DESCRIPTION OF THE DRAWINGS

The name of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiment of the present invention will now be described in detail with reference to the accompanying drawings.

Figure 1:
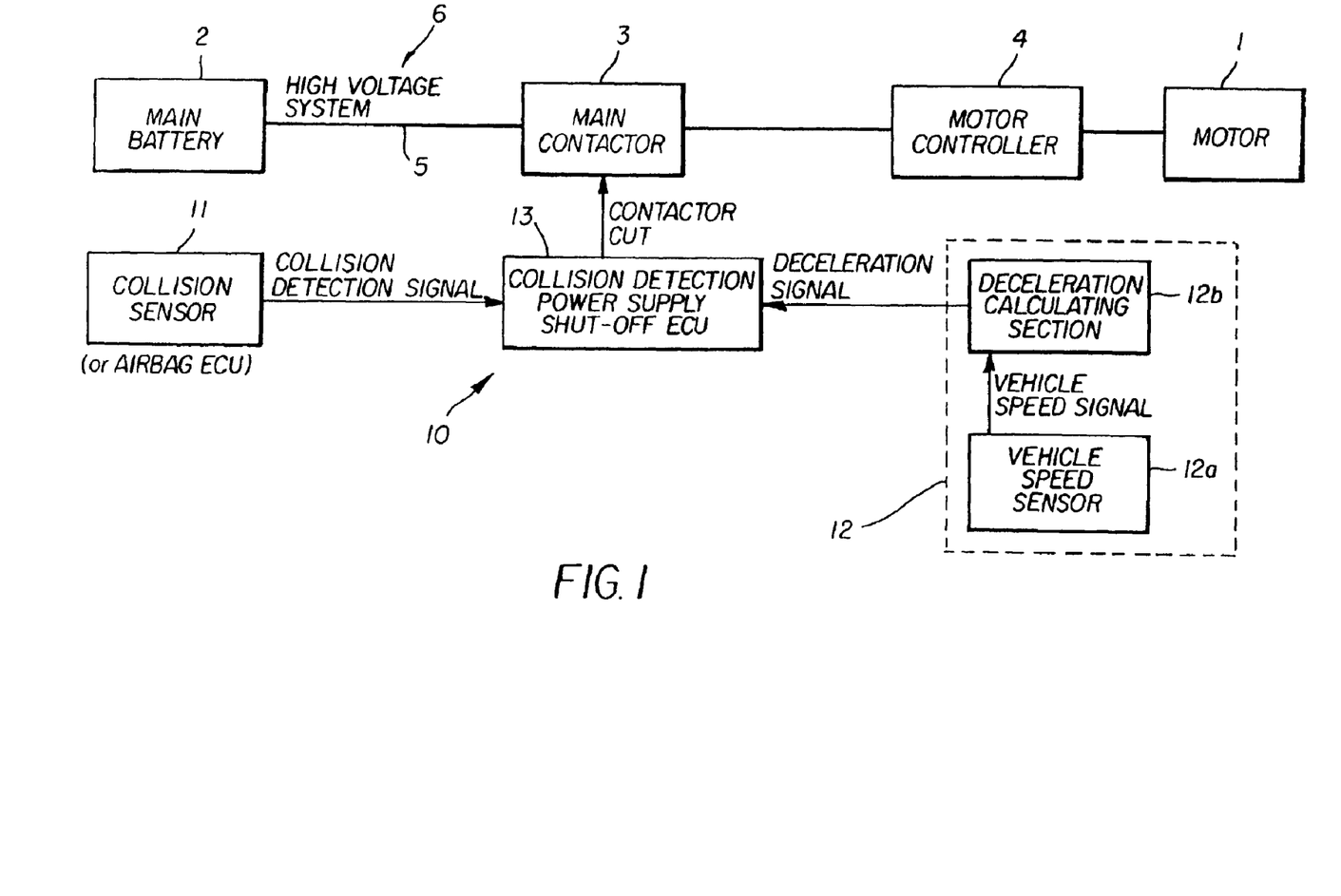
FIG. 1 is a block diagram showing a principal part of a motor vehicle and a high voltage system shut-off apparatus thereof according to a first embodiment of the present invention.

A motor vehicle according to a first embodiment is an electric vehicle that acquires driving power for running from a high voltage power supply of several hundred volt, for example. As shown in FIG. 1, the motor vehicle has a motor 1 for rotating driving wheels to run the vehicle. To supply power to the motor 1, the motor vehicle is comprised of a main battery 2 to which are serial-connected a number of 12-bolt batteries, a main contactor 3 (feeding circuit breaking and connecting device) that is connected to the main battery 2, and a motor controller 4 that is disposed between the main contactor 3 and the motor 1.

With this arrangement, the motor 1 is rotated by the power supplied from the main battery 2 via the main contactor 3 under the control of a motor controller 4. It should be noted that the main battery 2 corresponds to a high voltage power supply, and the main battery 2, main contactor 3, motor controller 4, and motor 1, and a circuit 5 that extends from the main battery 2 to the motor controller 4 and the motor 1 will be generically referred to as a high voltage power supply system 6.

A high voltage system shut-off apparatus 10 is comprised of a collision sensor (collision detecting device) that detects a collision of the motor vehicle, a deceleration detecting device 12 that detects the deceleration of the motor vehicle, and a collision detection power supply shut-off ECU (high voltage system shut-off control device; feeding circuit control device, inhibiting device) 13 that controls breaking of the circuit 5 of the high voltage power supply 2.

An acceleration sensor comprised of a piezo element and the like and an engineering sensor comprised of a fiber optics, an emitter, and the like may be employed as the collision sensor 11, but this is not limitative. A conventional collision sensor provided for an air bag may be employed as the collision sensor 11 by using information from the collision sensor directly or via an air bag ECU, for example. According to the present embodiment, the deceleration detecting device 12 is comprised of a vehicle speed sensor 12a and a deceleration calculating section 12b that calculates the deceleration from a vehicle speed signal supplied from the vehicle speed sensor 12a, but an acceleration sensor that detects the deceleration in a wide range a running direction of the vehicle may be used as the deceleration detecting device 12.

The collision detection power supply shut-off ECU 13 breaks the circuit 5 of the high voltage power supply 2 via the main contactor 3 in response to a collision detection signal from the collision sensor 11. If a deceleration detected by the deceleration detecting device 12 does not become equal to or greater than a predetermined value within a predetermine period of time from the receipt of the collision detection signal from the collision sensor 11, the collision detection power supply shut-off ECU 13 provides control to reconnect the circuit 5 of the high voltage power supply 2, which has been broken via the main contactor 3.

Figure 2:
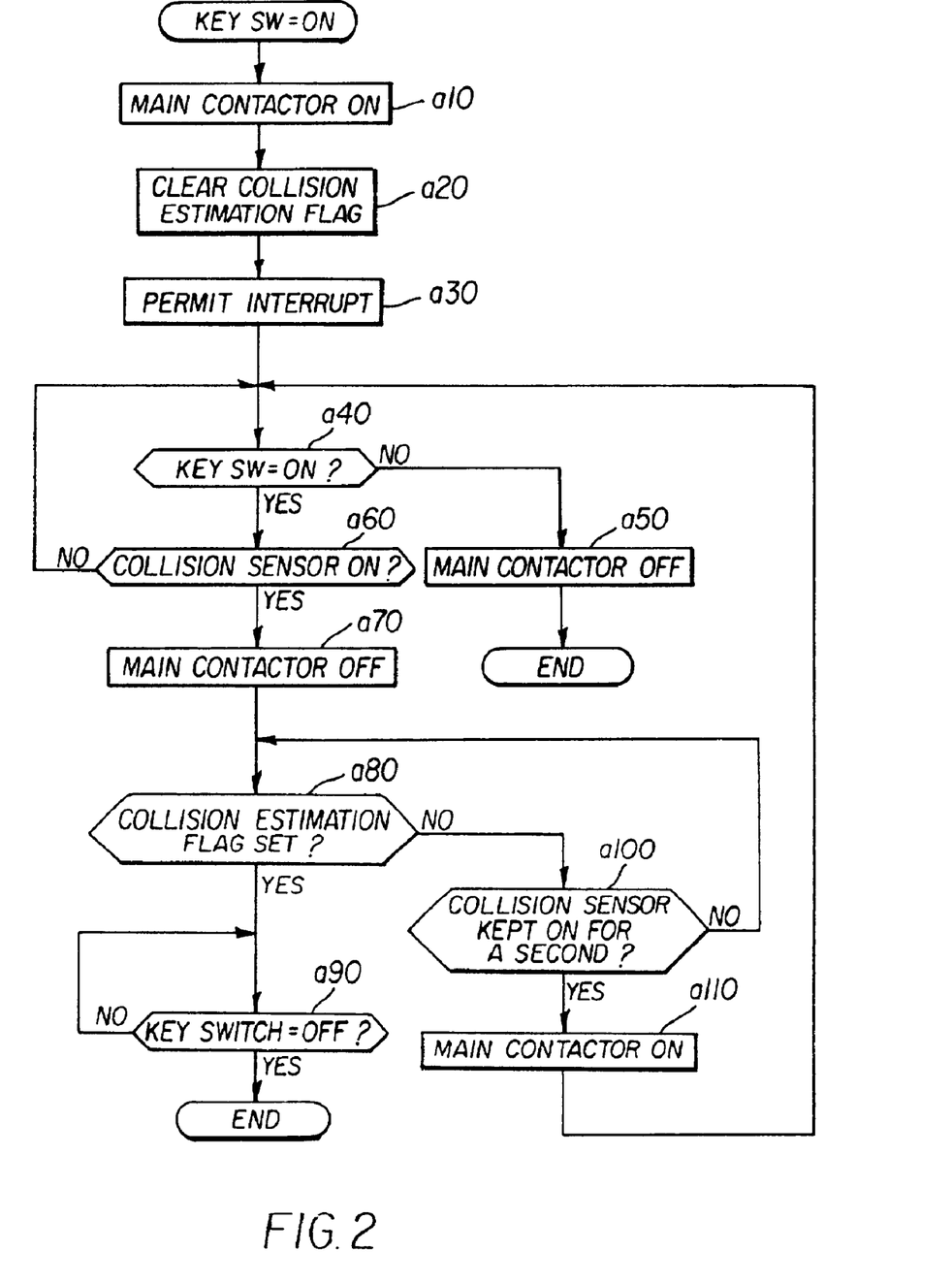
FIG. 2 is a flow chart showing a main routine of operations of the high voltage system shut-off apparatus according to the first embodiment of the present invention.
Figure 3:
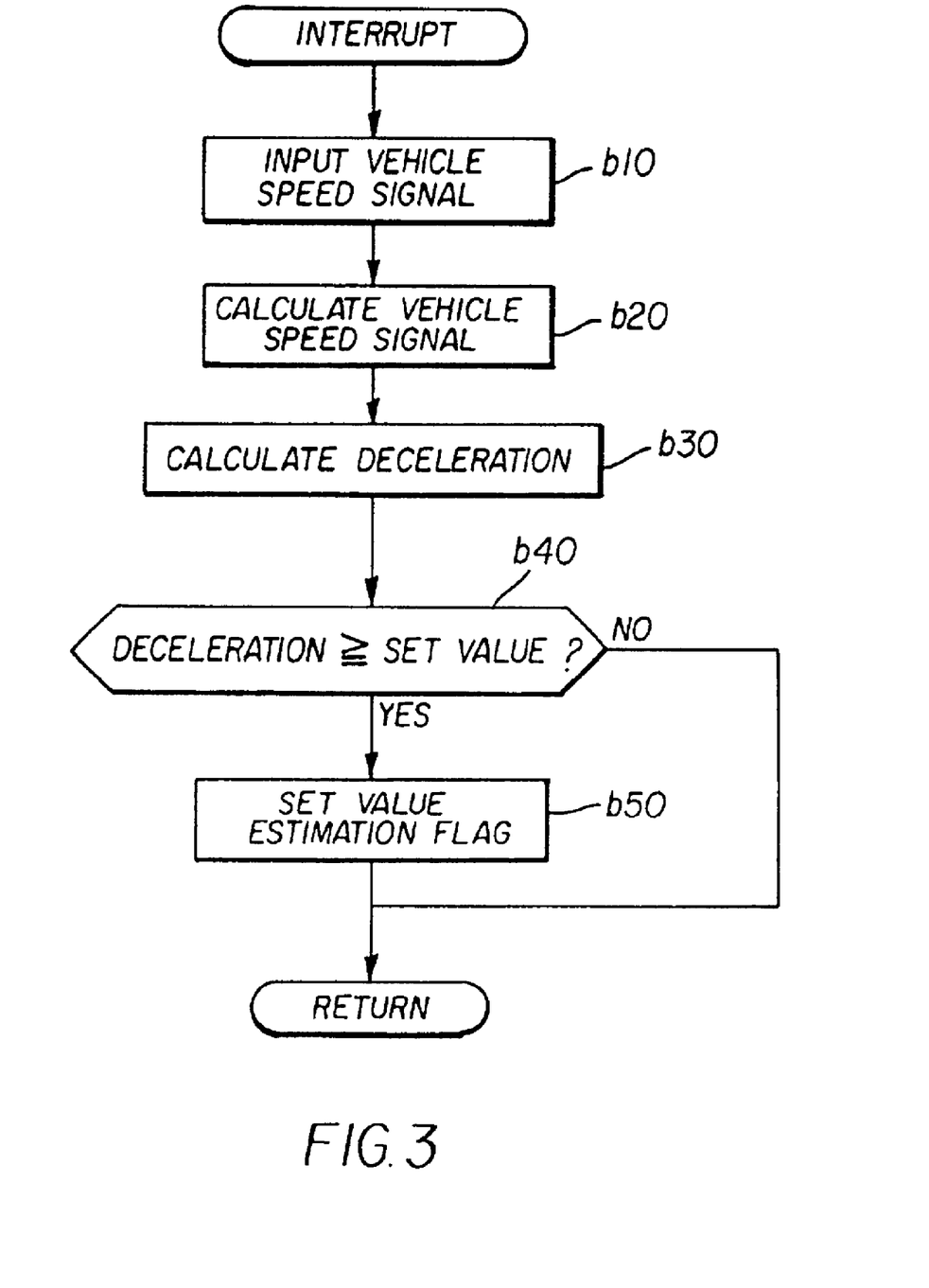
FIG. 3 is a flow chart showing a sub routine of operations of the high voltage system shut-off apparatus according to the first embodiment of the present invention.

With the above-described arrangement, the high voltage system shut-off apparatus according to the first embodiment of the present invention provides control such that the high voltage system is shut off according to the procedure in FIGS. 2 and 3, for example.

As shown in a main routine of FIG. 2, in response to turning-on of a key switch of a drive system of the motor vehicle, the main contactor 3 is turned on (step a10), a collision estimation flag is cleared (step a20), and an interrupt is permitted (step a30).

In response to the permission of the interrupt, a deceleration determination routine as shown in FIG. 3 is executed periodically. Specifically, as shown in FIG. 3, the deceleration calculating section 12b of the deceleration detecting device 12 receives a vehicle speed signal from the vehicle speed sensor 12a (step b10), calculates a vehicle speed from the vehicle speed signal (step b20), and calculates a deceleration according to the calculated vehicle speed (step b30). The collision detection power supply shut-off ECU 13 determines whether the calculated deceleration is not smaller than a set value (predetermined value) that is determined in advance (step b40), and sets the collision estimation flag if the calculated deceleration is equal to or greater than the set value (step b50). It should be noted hat the set value is determined in advance based on the results of an experiment and the like.

Referring again to the main routine of FIG. 2, after the permission of the interrupt (step a30), the high voltage power supply shut-off apparatus determines whether the key switch is ON or not (step a40). If it is determined that the key switch is OFF (i.e. the key switch is turned off), the main contactor 3 is turned off (step a50) to terminate the control. If it is determined that the key switch is ON, it is then determined whether collision detection information has been inputted from the collision detection sensor 11 or not (i.e. whether the collision sensor 11 is ON or not) (step s60).

If it is determined that the collision detection information has not been inputted from the collision sensor 11, the process returns to the step a40. The determination in the step a40 is carried out at predetermined intervals.

On the other hand, if it is determined the collision detection information has been inputted from the collision sensor 11, it is provisionally determined that the vehicle has collided, and the main contactor 3 is turned off (step a70). Further, it is determined whether the collision estimation flag is set or not in the deceleration determination routine (FIG. 3) (step a80). If it is determined that the collision estimation flag is set, it is really determined that the vehicle has collided, and the main contactor 3 is kept OFF. It is then determined whether the key switch is OFF or not (step a90), and if the key switch is turned off, the control is terminated. It should be noted that the determination in the step a90 is carried out at predetermined intervals.

If the collision estimation flag is not set after the turning-off of the main contactor 3 due to the provisional determination that the vehicle has collided, it is then determined whether or not a predetermined period of time (in this example, one second) has elapsed with the collision estimation flag being not set since the collision of the vehicle is detected (i.e. after the collision sensor 11 is turned on) (step a100). Even if the predetermined period of time has elapsed the with the estimation flag being not set since the detection of the vehicle collision, it is determined that the collision of the vehicle has been falsely detected, and the main contactor 3 is turned on (step a110). The process then returns to the step a40.

As described above, upon receipt of the collision detection information from the collision sensor 11, the collision detection power supply shut-off ECU 13 provisionally determines that the vehicle has collided, and promptly turns off the main contactor 3 to break the circuit 5 of the high voltage power supply 2. This prevents vehicle fire, electrifying shock, and the like caused by the flow of electric current from the high voltage power supply in the collision of the vehicle.

Moreover, if the deceleration does not become equal to or greater than the predetermined value in a predetermined period of time after it is provisionally determined that the vehicle has collided, it is then determined that the provisional determination is false, and the main contactor 3 is turned on to reconnect the circuit 5 of the high voltage power supply 2. Therefore, even if the circuit of the high voltage power supply is broken due to the malfunctioning of the collision sensor 11, the driving power for running the vehicle is ensured thereafter.

A second embodiment of the present invention will now be described with reference to the accompanying drawings.

The hardware construction of a motor vehicle and a high voltage system shut-off apparatus according to the second embodiment is identical with that of the first embodiment, and a description thereof is omitted herein. Only the software construction, which is different from that of the first embodiment, will be described below.

According to the present embodiment, it is determined that the vehicle has collided on the following two conditions: 1) the collision sensor 11 is turned on (i.e. the collision sensor 11 detects a collision of the vehicle), and 2) a deceleration detected (calculated) by the deceleration detecting device 12 becomes equal to or greater than a predetermined value within a predetermined period of time after turning-on of the collision sensor 11. If the two conditions 1) and 2) are satisfied, the collision detection power supply shut-off ECU 13 provides control such that the main contactor 3 is turned off to break the circuit 5 of the high voltage power supply 2.

Figure 4:
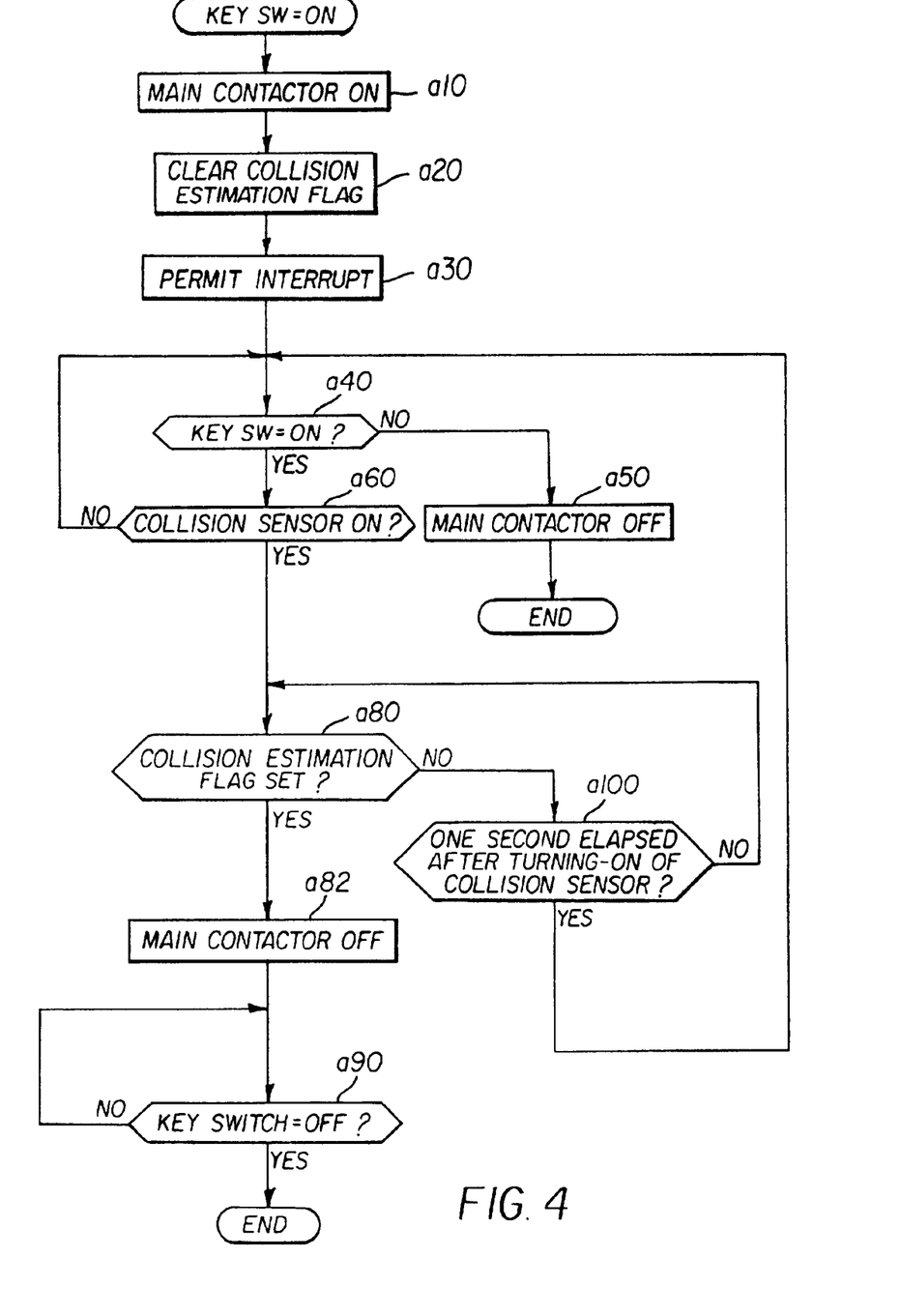
FIG. 4 is a flow chart showing a main routine of operations of a high voltage system shut-off apparatus according to a second embodiment of the present invention.

With the above-described arrangement, the high voltage power supply shut-off apparatus of the motor vehicle according to the second embodiment of the present invention controls the breaking of the high voltage system according to the procedure in FIG. 4, for example. It should be noted that in FIG. 4, the same reference numerals as those of FIG. 2 denote the same process steps, and the deceleration determination routine in FIG. 3 is also carried out in response to permission of an interrupt (step a30 in FIG. 3).

As shown in a main routine of FIG. 4, in response to turning-on of a key switch of a drive system of the motor vehicle, the main contactor 3 is turned on (step a10), a collision estimation flag is cleared (step a20), and an interrupt is permitted (step a30) to carry out the deceleration determination routine in FIG. 3.

After the permission of the interrupt (step a30), the high voltage power supply shut-off apparatus determines whether the key switch is ON or not (step a40). If the key switch is not ON (i.e. the key switch is turned off), the main contactor 3 is turned off (step a50) to terminate the control. If the key switch is ON, it is then determined whether collision detection information has been inputted from the collision detection sensor 11 or not (i.e. whether the collision sensor 11 is ON or not) (step s60). If the collision detection information has not been inputted from the collision sensor 11, the process returns to the step a40. The determination in the step a40 is carried out at predetermined intervals.

On the other hand, if the collision detection information is inputted from the collision sensor 11, it is determined whether the collision estimation flag is set or not in the deceleration determination routine (FIG. 3) (step a80). If the collision estimation flag is set, it is really determined that the vehicle has collided, and the main contactor 3 is kept OFF (step a82). It is then determined whether the key switch is OFF or not (step a90), and if the key switch is turned off, the control is terminated. It should be noted that the determination in the step a90 is also carried out at predetermined intervals.

If it is determined in the step a80 that the collision estimation flag is not set, the process proceeds to the step a100 wherein it is determined whether or not a predetermined period of time (in this example, one second) has elapsed since the collision of the vehicle is detected (i.e. after the collision sensor 11 is turned on). If the predetermined period of time has not elapsed since the collision of the vehicle is detected, the process returns to the step a80 wherein it is determined whether the collision estimation flag is set or not. Thus, if the collision estimation flag is set within the predetermined period of time after the collision of the vehicle is detected, it is then determined that the vehicle has collided, and the main contactor 3 is turned off (step a82).

On the other hand, if the collision estimation flag is not set within the predetermined period of time after the collision of the vehicle is detected, it is determined that the collision of the vehicle has been falsely detected, and the main contactor 3 is kept ON (step a110). The process then returns from the step a100 to the step a40.

As described above, on condition that the collision detection information is inputted from the collision sensor 11 and the collision estimation flag is set within a predetermined period of time after the input of the collision detection information (i.e. the deceleration of the motor vehicle becomes equal to or greater than a predetermined value), the collision detection power supply shut-off ECU 13 determines that the vehicle has collided and controls the main contactor 3. Therefore, the collision detection power supply shut-off ECU 13 is able to correctly determine whether the vehicle has collided or not, and surely turn off the main contactor 3 to break the circuit 5 of the high voltage power supply 2 only in a case where the vehicle has really collided.

This prevents vehicle fire, electrifying shock, and the like caused by the flow of electric current from the high voltage power supply at the time of collision. Further, since it is correctly determined whether the vehicle has collided or not, the circuit of the high voltage power supply is prevented from being broken according to the false determination that the vehicle has collided, thus ensuring driving power for running the motor vehicle.

A third embodiment of the present invention will now be described.

Figure 5:
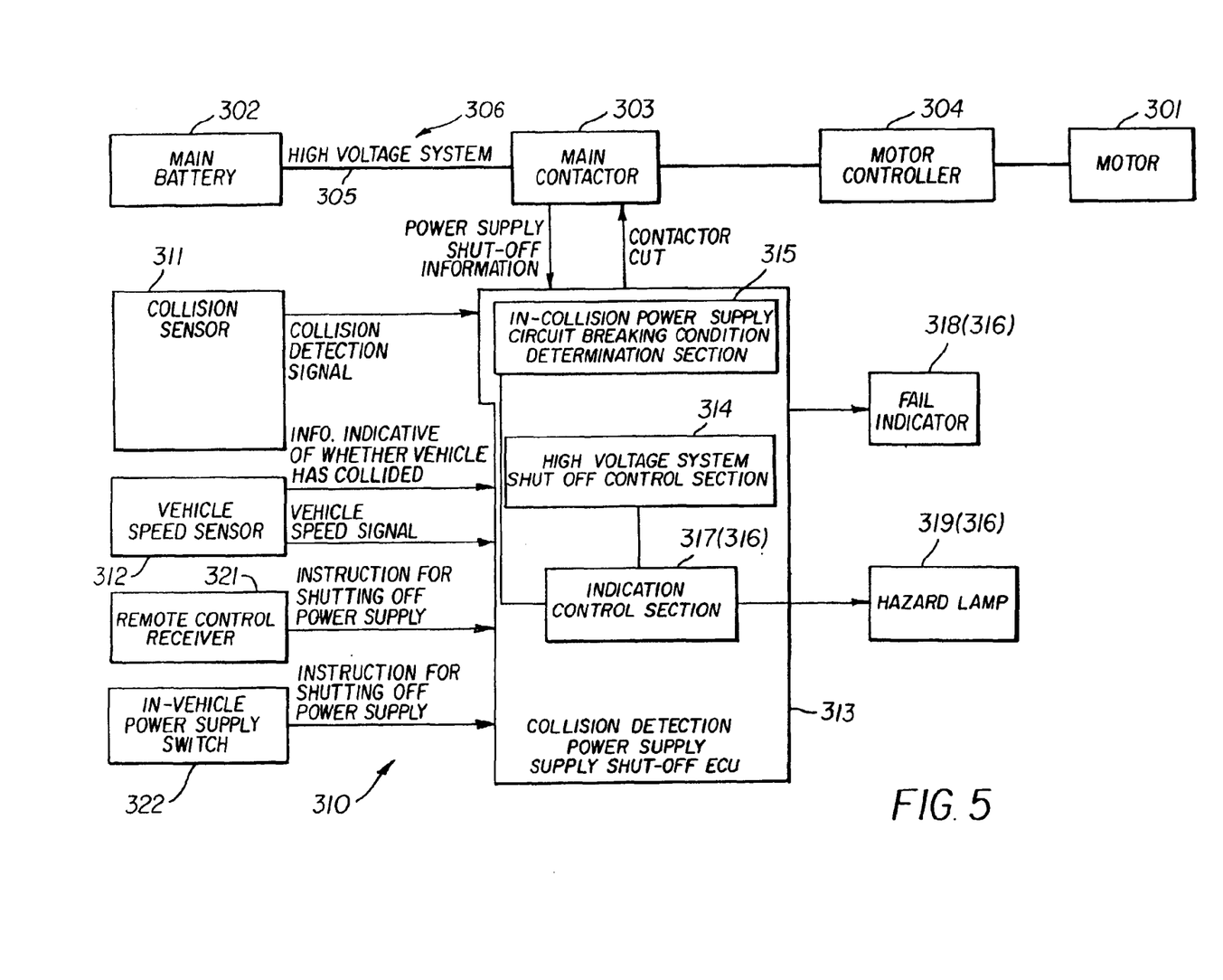
FIG. 5 is a block diagram showing a principal part of a motor vehicle and a high voltage system shut-off apparatus thereof according to a third embodiment of the present invention.

A motor vehicle according to the present embodiment is an electric motor vehicle that acquires driving power for running from a high voltage power supply of several hundred volts, for example. As shown in FIG. 5, the motor vehicle has a motor 301 for rotating driving wheels to run the vehicle. To supply power to the motor 301, the motor vehicle is comprised of a main battery 302 to which are serial-connected a number of 312-bolt batteries, a main contactor 203 that is connected to the main battery 302, and a motor controller 304 that is disposed between the main contactor 303 and the motor 301.

With this arrangement, the motor 301 is rotated by the power supplied from the main battery 302 via the main contactor 303 under the control of a motor controller 304. It should be noted that the main battery 302 corresponds to a high voltage power supply, and the main battery 302, main contactor 303, and motor controller 304, and a circuit that extends from the main battery 302 to the motor controller 304 via the main contactor 303 will be generically referred to as a high voltage power supply system 6.

A high voltage system shut-off apparatus 310 is comprised of a collision sensor (collision detecting device) 311 that detects a collision of the motor vehicle, a deceleration detecting device 312 that detects the deceleration of the motor vehicle, a high voltage system shut-off control section 314 that controls breaking of the circuit 305 of the high voltage power supply 302, a power supply circuit breaking condition determination section 315 that determines whether the circuit 305 of the high voltage power supply 302 has been broken or not, an indicating device that supplies information indicative of whether the circuit 305 of the high voltage power supply 302 has been broken or not, a remote control receiver 321 that serves as a high voltage system manual shut-off device for manually breaking the circuit 305 of the high voltage power supply 302, and an in-vehicle power supply switch 322.

An acceleration sensor comprised of a piezo-element or the like, or an engineering sensor that is comprised of a fiber optics, an emitter, and the like may be employed as the collision sensor 311, but this is not imitative. A conventional collision sensor provided for an air bag may be employed as the collision sensor 311 by using information from the collision sensor directly or via an air bag ECU.

The high voltage system shut-off control section 314 and the power supply circuit breaking condition determination section 315 are functional component parts of the collision detection power supply shut-off ECU 313.

The high voltage system shut-off section 314 breaks the circuit 305 of the high voltage power supply 302 via the main contactor 303 in response to the collision detection signal from the collision sensor 311. However, if the motor vehicle does not decelerate by a predetermined value or greater within a predetermined period of time t1 from a time point when the collision detection signal is received from the collision sensor 11, the vehicle has not really collided. In this case, the high voltage system shut-off device 314 determines that the collision of the vehicle has been falsely detected by the collision sensor 311, and reconnects the circuit 305 of the high voltage power supply 302 via the main contactor 303.

Thus, according to the present embodiment, if the deceleration of the motor vehicle becomes equal to or greater than a predetermined value within the predetermined period of time t1 after the collision is detected by the collision sensor 311, it is determined that the motor vehicle has really collided. On the other hand, if the deceleration of the motor vehicle does not become equal or greater than the predetermined value within the predetermined period of time t1 after the collision is detected by the collision sensor 311, it is determined that the motor vehicle has not really collided. In an alternative form, it may be determined that the motor vehicle has really collided if the vehicle speed is kept at 0 for a predetermined period of time tt1 or longer in a predetermined period of time t2 (t2>t1) after the collision is detected by the collision sensor 311, and it may be determined that the motor vehicle has not really collided if the vehicle speed is not kept at 0 for the predetermined period of time tt1 or longer within the predetermined period of time t2 (t2>t1) after the collision is detected by the collision sensor 311.

The power supply circuit breaking condition determination section 315 determines whether the deceleration of the motor vehicle becomes equal to or greater than the predetermined value within the predetermined period of time t1 after the collision is detected by the collision sensor 311. If the vehicle speed is kept at 0 for a predetermined period of time tt2 (tt2 may be equal to tt1) in a predetermined period of time t3 (t3>t1 or t3=t2) after the collision is detected by the collision sensor 311, the power supply circuit breaking condition determination device 315 determines whether the circuit of the high voltage power supply has been broken by the high voltage system shut-off control section 314 according to current-carrying information supplied from the main contactor 303. The purpose of determining whether or not the vehicle speed is kept at 0 for the predetermined period of time tt2 or longer is to determine and indicate whether the circuit of the high voltage power supply has been broken or not.

In an alternative form, in the case where it is determined that the motor vehicle has not really collided if the vehicle speed has kept at 0 for the predetermined period of time tt1 or longer in the predetermined period of time t2 after the collision, it may be determined that the vehicle has really collided if the vehicle speed has been kept at 0 for the predetermined period of time tt1 in the predetermined period of time t2 after the detection of the collision, and it may be determined whether the circuit of the high voltage power supply has been broken by the high voltage system shut-off control section 314 according to the current-carrying information supplied from the main contactor 303.

The indicating device 316 is comprised of a fail indicator 318, a hazard lamp 319, and an indication control section 317 that controls the fail indicator 318 and the hazard lamp 319. The indication control section 317 is a functional component part of the collision detection power supply shut-off ECU 313. If the power supply circuit breaking condition determination section 315 determines whether the circuit of the high voltage power supply has been broken or not after the collision, the indication control device 317 provides control such that the fail indicator 318 and the hazard lamp 319 indicate whether the circuit of the high voltage power supply has been broken or not according to the result of the determination by the power supply circuit breaking condition determination circuit 315.

Specifically, the fail indicator 318 and the hazard lamp 319 indicate information in different manners according to whether the circuit of the high voltage power supply is broken or not after the collision. For example, if the fail indicator 318 is implemented by an indicator lamp, it is turned on only in the case where the circuit of the high voltage power supply is not broken after the collision, but is turned off in other cases. Further, the hazard lamp 319 may be flashed (special flashing) in a different rhythm from normal flashing in the case where the circuit of the high voltage power supply is not broken after the collision.

In an alternative form, the information may be indicated by a sound generated by a buzzer or the like, and more preferably, the information is indicated by a voice representing the message "high voltage power supply circuit is connected", for example.

It goes without saying that if the circuit of the high voltage power supply is broken after the collision, it may be indicated by the fail indicator 318, the hazard lamp 319, the buzzing sound, the voice, and the like. For example, if the fail indicator 318 is set to continuously light up in the case where the circuit of the high voltage power supply has not been broken since the collision, it may be flashed when the circuit of the high voltage power supply is broken. If the hazard lamp 318 is set to be flashed in a particular way in the case where the circuit of the high voltage power supply has not been broken since the collision, it may be flashed in a normal way if the circuit of the high voltage power supply has been broken. Further, the voice may represent the message "high voltage power supply circuit has been broken due to collision".

The remote control receiver 321 and the in-vehicle power supply switch 322 serving as the high voltage system manual shut-off device are operated on predetermined conditions. According to the present embodiment, the remote control receiver 321 and the in-vehicle power supply switch 322 are operated in the case where the following conditions are satisfied: 1) the motor vehicle has collided, 2) the circuit of the high voltage power supply has not been shut off, and 3) the motor vehicle has stopped (the vehicle speed has been kept at 0 for a predetermined pored of time).

These operating conditions 1), 2) and 3) are intended to restrict the manual breaking of the high voltage power supply circuit to the minimum so as to prevent the high voltage power supply circuit from being shut off excessively. According to the present embodiment, it is necessary to satisfy all of the conditions 1) the motor vehicle has collided, 2) the circuit of the high voltage power supply has not been shut off, and 3) the motor vehicle has stopped (the vehicle speed has been kept at 0 for a predetermined pored of time). In particular, the condition 3) is intended to prevent the circuit of the high voltage power supply from being broken while the vehicle is running backward, so that the vehicle can be prevented from being disenabled to run.

If the above operating conditions are satisfied, the remote control receiver 321 is responsive to a shut-off instruction signal from an external remote control (not illustrated), for outputting a signal for instructing the main contactor 303 to break the circuit of the high voltage power supply or turns off another power supply connecting switch (shut off the power supply). If the in-vehicle power supply switch 322 is operated in the case where the above operating conditions are satisfied, it outputs a signal for instructing the main contactor 303 to break the circuit of the high voltage power supply or turns off another power supply connecting switch (shut off the power supply).

Figure 6:
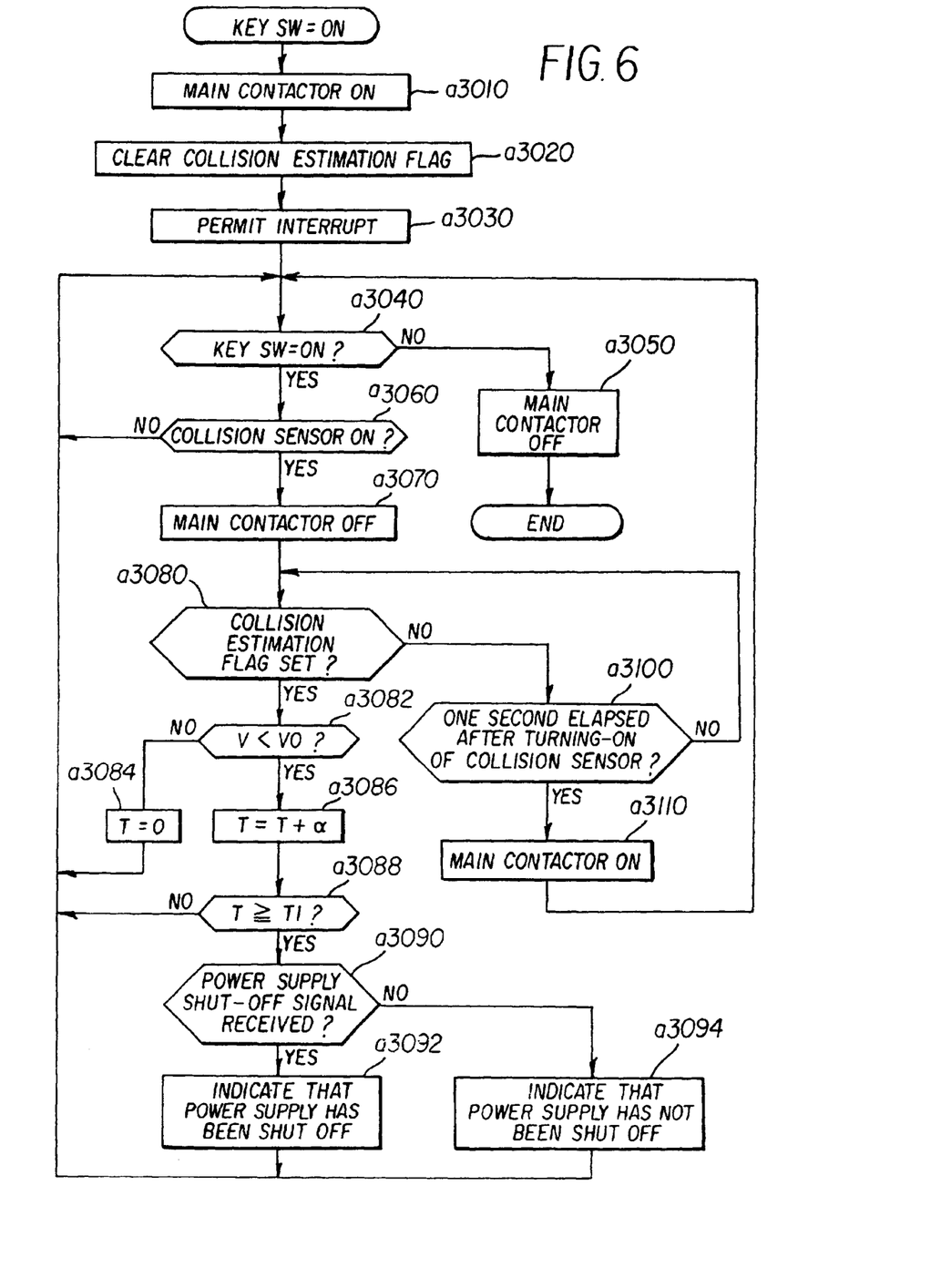
FIG. 6 is a flow chart showing a main routine of operations of a high voltage system shut-off apparatus according to the third embodiment of the present invention.
Figure 7:
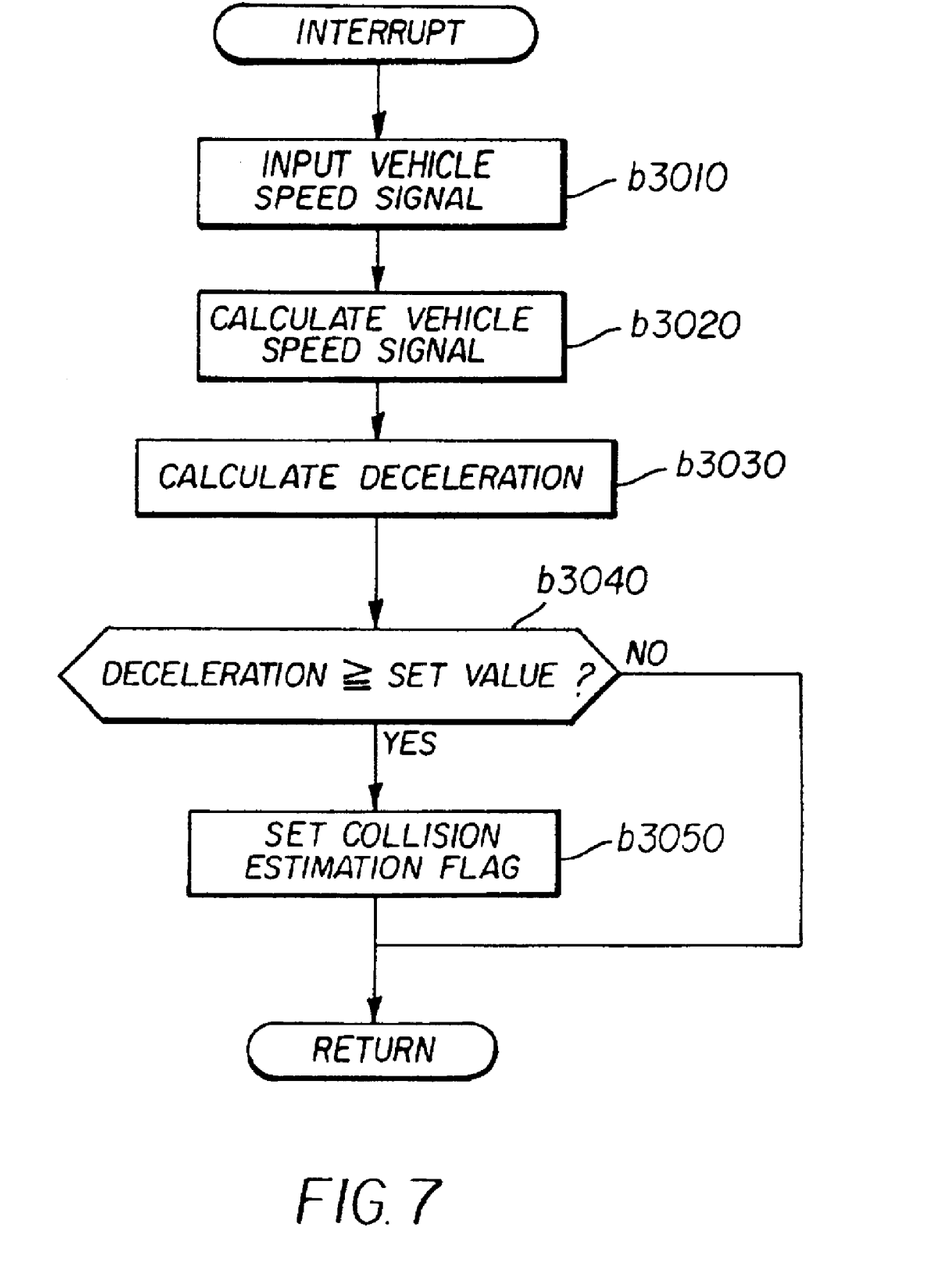
FIG. 7 is a flow chart showing a sub routine of operations of a high voltage system shut-off apparatus according to the third embodiment of the present invention.

With the above-described arrangement, the high voltage system shut-off apparatus of the motor vehicle according to the third embodiment controls the shut-off of the high voltage system and indicates the breaking condition as shown in FIGS. 6 and 7, for example.

As shown in a main routine of FIG. 6, in response to turning-on of a key switch of a drive unit of the motor vehicle, the main contactor 303 is turned on (step a3010), a collision estimation flag is cleared (step a3020), and an interrupt is permitted (step a3030).

In response to the permission of the interrupt, a deceleration determination routine as shown in FIG. 7 is executed periodically. Specifically, as shown in FIG. 7, a vehicle speed signal is inputted from the vehicle speed sensor 312 (step b3010), a vehicle speed is calculated from the vehicle speed signal (step b3020), and a deceleration is calculated according to the calculated vehicle speed (step b3030). The collision detection power supply shut-off ECU 313 determines whether the calculated deceleration is not smaller than a set value (predetermined value) that is determined in advance (step b3040), and sets the collision estimation flag if the calculated deceleration is equal to or greater than the set value (step b3050). It should be noted that the set value is determined in advance based on the results of an experiment and the like.

Referring again to the main routine of FIG. 6, after the permission of the interrupt (step a3030), the high voltage power supply shut-off apparatus determines whether the key switch is ON or not (step a3040). If the key switch is not ON (i.e. the key switch is turned off), the main contactor 303 is turned off (step a3050) to terminate the control. If the key switch is ON, it is determined whether collision detection information has been inputted from the collision detection sensor 311 or not (i.e. whether the collision sensor 311 is ON or not) (step s3060).

If it is determined that the collision detection information has not been inputted from the collision sensor 311, the process returns to the step a3040. It should be noted that the determination in the step a3040 is carried out at predetermined intervals.

On the other hand, if it is determined that the collision detection information has been inputted from the collision sensor 311, it is provisionally determined that the vehicle has collided, and the main contactor 303 is turned off (step a3070). Further, it is determined whether the collision estimation flag is set or not in the deceleration determination routine (FIG. 7) (step a3080).

If the collision estimation flag is set, it is really determined that the vehicle has collided, and the main contactor 303 is kept OFF. It is then determined whether the vehicle speed V is lower than a micro speed value V0 (i.e. the vehicle has stopped) or not (step a3082). If it is determined that the vehicle speed V is not lower than the micro speed value V0, in other words, if the vehicle has not stopped, a timer is reset to 0 (step a3084) and the process returns to the step a3040.

If it is determined that the vehicle speed V is lower than the micro speed value V0, in other words, if the vehicle has stopped, the value indicated by the timer is incremented by a predetermined value α (control cycle) and the process returns to the step a3086 wherein it is determined whether the value indicated by the timer has reached a predetermined period of time T1 or not. If it is determined that the value indicated by the timer has not reached a predetermined period of time T1, the process returns to the step a3040.

If it is determined in the step a3086 that the value indicated by the timer has not reached the predetermined period of time T1, it indicates that the vehicle has continuously stopped for the predetermined period of time T1. It is then determined whether a power supply shut-off signal has been received or not (step a3090). If the power supply shut-off signal has been received, information indicating that the power supply has been shut off is supplied by the fail indicator 318, the hazard lamp 319, the buzzer, the voice, and the like (step a3092). If the power supply shut-off signal has not been received, information indicating that the power supply has not been shut off is supplied by the fail indicator 318, the hazard lamp 319, the buzzer, the voice, and the like (step a3094).

Since passengers or rescuers are notified of whether the power supply (high voltage power supply) has been shut off or not since the stop of the vehicle in the case of collision, they can cope with the accident while recognizing whether the circuit of the high voltage power supply has been broken or not. If the circuit of the high voltage power supply has been broken, they can promptly cope with the accident without being concerned about leakage, and if the circuit of the high voltage power supply has not been shut off, they can cope with the accident while being concerned about leakage.

In the case where the motor vehicle has collided but the circuit of the high voltage power supply has not been shut off, if the high voltage power supply circuit is broken by operating a remote control switch (remote control), not shown, the remote control receiver 321 is responsive to a shut-off instruction signal from the remote control, for outputting a signal for instructing the main contactor 303 to break the circuit of the high voltage power supply or turning off another power supply connecting switch (shuts off the power supply). This breaks high voltage power supply circuit, and enables rescuers to promptly cope with the accident without being concerned about leakage.

In the case where the motor vehicle has collided but the circuit of the high voltage power supply has not been broken, a passenger on the motor vehicle operates the in-vehicle power supply switch 322 to output a signal for instructing the main contactor 303 to break the circuit of the high voltage power supply or turns off another power supply connecting switch (shut-off the power supply). This breaks the high voltage power supply circuit, and enables the passenger on the motor vehicle to promptly cope with the accident without being concerned about leakage.

Further, the high voltage power supply circuit is broken by the remote control switch or the like on conditions that the motor vehicle has collided, the circuit of the high voltage power supply has not been shut off, and the vehicle has stopped (the vehicle speed is kept at 0 for a predetermined period of time), and this prevents the circuit of the high voltage power supply from being broken to inhibit the motor vehicle from being disenabled to run while it is running backward.

On the other hand, if the collision estimation flag is not set after the turning-off of the main contactor 303 due to the provisional determination that the vehicle has collided, it is determined whether a predetermined period of time (in this example, one second) has elapsed with the collision estimation flag being not set after the collision of the vehicle is detected (i.e. after the collision sensor 11 is turned on) (step a3100). If the predetermined period of time has elapsed with the collision estimation flag being not set after the collision of the vehicle is detected, it is determined that the collision of the vehicle has been falsely detected, and the main contactor 303 is turned on (step a3110). The process then returns to the step a3040.

As described above, in response to the input of the collision detection information from the collision sensor 311, the collision detection power supply shut-off ECU 313 provisionally determines that the vehicle has collided, and immediately turns off the main contactor 303 to break the circuit 305 of the high voltage power supply 302. This prevents vehicle fire, electrifying shock, and the like caused by the flow of electric current from the high voltage power supply at the time of collision.

Moreover, if the deceleration does not become equal to or greater than the predetermined value after it is provisionally determined that the vehicle has collided, it is determined that the provisional determination is false, and the main contactor 303 is turned on to reconnect the circuit 305 of the high voltage power supply 302. Therefore, even if the circuit of the high voltage power supply is broken due to the false determination by the collision sensor 11, the driving power for running the vehicle can be ensured thereafter.

Figure 8:
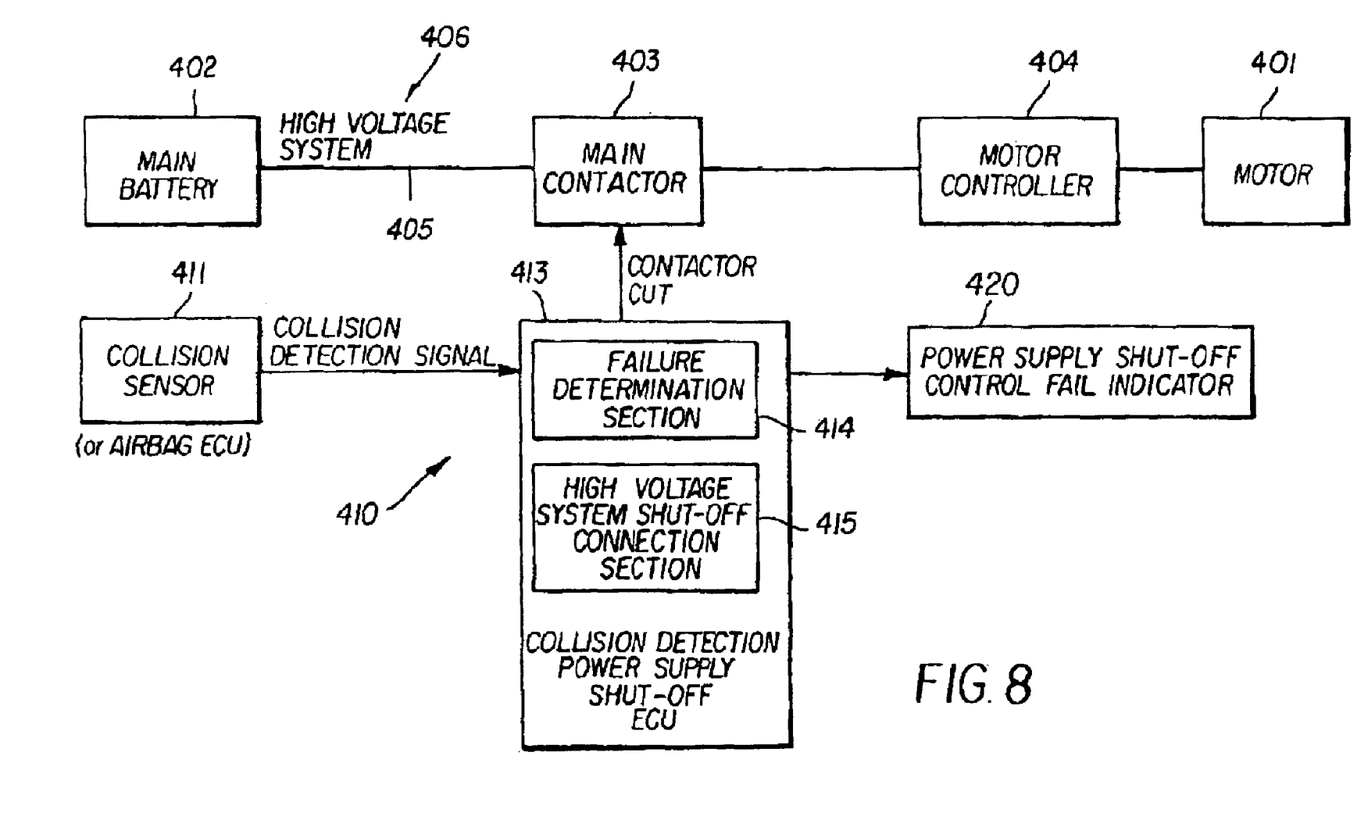
FIG. 8 is a block diagram showing a principal part of a motor vehicle and a high voltage system shut-off apparatus thereof according to a fourth embodiment of the present invention.

A motor vehicle according to the present embodiment is an electric motor vehicle that acquires driving power for running from a high voltage power supply of several hundred volt, for example. As shown in FIG. 8, the motor vehicle has a motor 401 for rotating driving wheels to run the vehicle. To supply power to the motor 401, the motor vehicle is comprised of a main battery 402 to which are serial-connected a number of 12-bolt batteries, a main contactor 403 that is connected to the main battery 402, and a motor controller 404 that is provided between the main contactor 403 and the motor 401.

With this arrangement, the motor 401 is rotated by the power supplied from the main battery 402 via the main contactor 403 under the control of a motor controller 404. It should be noted that the main battery 402 corresponds to a high voltage power supply, and the main battery 402, main contactor 403, motor controller 404, and motor 401, and a circuit 405 that extends from the main battery 402 to the motor controller 404 and the motor 401 will be generically referred to as a high voltage power supply system 406.

A high voltage system shut-off apparatus 410 according to the present embodiment is comprised of a collision sensor (collision detecting device) 411 that detects a collision of the motor vehicle, a deceleration detecting device (not illustrated, but similar to the one illustrated in FIG. 1) that detects the deceleration of the motor vehicle, a collision detection power supply shut-off ECU (high voltage system shut-off control system) 413 that controls breaking of the circuit 405 of the high voltage power supply 402, a power supply shut-off control fail indicator (failure indicating device) 420. The collision detection power supply shut-off ECU 413 is provided with a failure determination section 414 and a high voltage system breaking and connection control section 415.

An acceleration sensor that outputs a voltage corresponding to the acceleration or deceleration, e.g. an acceleration sensor using a piezo element or the like may be employed as the collision sensor 411. If the motor vehicle collides, the motor vehicle decelerates to an extent that is impossible when the motor vehicle is running normally. Thus, in response to a voltage signal indicative of a voltage equal to or higher than a predetermined value (the voltage equal to or greater than the predetermined value is regarded as a collision detection signal), it may be determined that the motor vehicle has collided. Namely, the collision sensor 411 outputs the collision detection signal only when the deceleration of the motor vehicle is equal to or greater than the predetermined value.

It should be noted that a large deceleration occurs in an extremely short period of time when the motor vehicle collides, the collision detection signal (signal indicative of a voltage equal to or higher than the predetermined value) is outputted from the collision sensor 411 only in such an extremely short period of time.

There is no intention to limit the collision sensor 411 to the one of the present embodiment. For example, an engineering sensor that is comprised of a fiber optics, an emitter and the like may be employed as the collision sensor 411, insofar as it is capable of being responsive to the deceleration occurring in collision of the motor vehicle. A conventional collision sensor provided for an air bag may be employed as the collision sensor 411 by using information from the collision sensor directly or via an air bag ECU.

The failure determination section 414 determines that the collision sensor 411 has failed if the collision detection signal is outputted from the collision sensor for a predetermined period of time or longer. As described above, the collision sensor 411 outputs the collision detection signal only when the motor vehicle decelerates to an extent that is impossible when the motor vehicle is normally running. Moreover, the motor vehicle decelerates to such an extent only if it has collided. Upon collision, the vehicle decelerates only in an extremely short period of time. Thus, the collision detection signal is outputted from the collision sensor 411 only in an extremely short period of time in which the motor vehicle considerably decelerates due to the collision. Therefore, if the collision detection signal is outputted from the collision sensor 411 for a predetermined period of time (determination time) or longer, the failure determination section 414 determines that the collision sensor 411 has failed.

It should be noted that the predetermined period of time (determination time) is set to be evidently longer than a period of time in which a large deceleration of not less than a predetermined value is assumed to occur in collision, but is set to be not excessively long (e.g. two seconds). Namely, insofar as a failure of the collision sensor 411 has not yet been detected, it is assumed first that the collision sensor 411 is normal when the collision sensor 411 outputs the collision detection signal, and the main contactor 403 is turned off. If the collision sensor 311 outputs the collision detection signal for an excessively long period of time, it is determined that the collision sensor 411 has failed, and the main contactor 403 is turned on to surely enable the vehicle to run.

If the collision sensor 411 outputs the collision detection signal due to a failure of the collision sensor 411, it is determined first that the collision sensor 411 is normal, and the driving power for running is lost temporarily to turn off the main contactor 403. The main contactor 403 is then turned on to ensure the driving power for running the vehicle. In this case, the driving power for running is lost since the collision sensor 411 starts outputting the collision detection signal until it is determined that the collision detection signal is outputted due to the failure of the collision sensor 411 (determination time), and a period of time in which the driving power for running is lost is preferably as short as possible. It goes without saying that the determination time should be extended to some extent in order to accurately determine whether the collision detection signal is resulting from a collision of vehicle or a failure of the collision sensor 411. From this standpoint, an appropriate period of time (e.g. two seconds) should be set as the determination time.

The high voltage system breaking and connection control section 415 provides control of current-carrying such that the circuit of the high voltage power supply 402 is broken in response to the collision detection signal from the collision sensor 411, and if it is determined that the failure determination section 414 determines that the collision sensor 411 has failed after the breaking of the circuit, the broken circuit of the high voltage power supply 402 is reconnected.

The power supply shut-off control fail indicator (failure indicating device) 420 is comprised of a valve that is controlled by the collision detection power supply shut-off ECU 413. If the failure determination section 414 determines that the collision sensor 411 has failed, the power supply shut-off control fail indicator 420 is lighted under the control of the collision detection power supply shut-off ECU 413 to notify a driver of that fact. More specifically, as is the case with other fail indicators, the power supply shut-off control fail indicator 420 is temporarily turned on just after an engine key switch is turned on. Thereafter, the power supply shut-off control fail indicator 420 is turned off if the failure determination section 414 does not output a failure determination signal indicative of a failure of the collision sensor 411, and the power supply shut-off control fail indicator 420 is kept ON if the failure determination section 414 outputs a failure determination signal indicative of a failure of the collision sensor 411.

Figure 9:
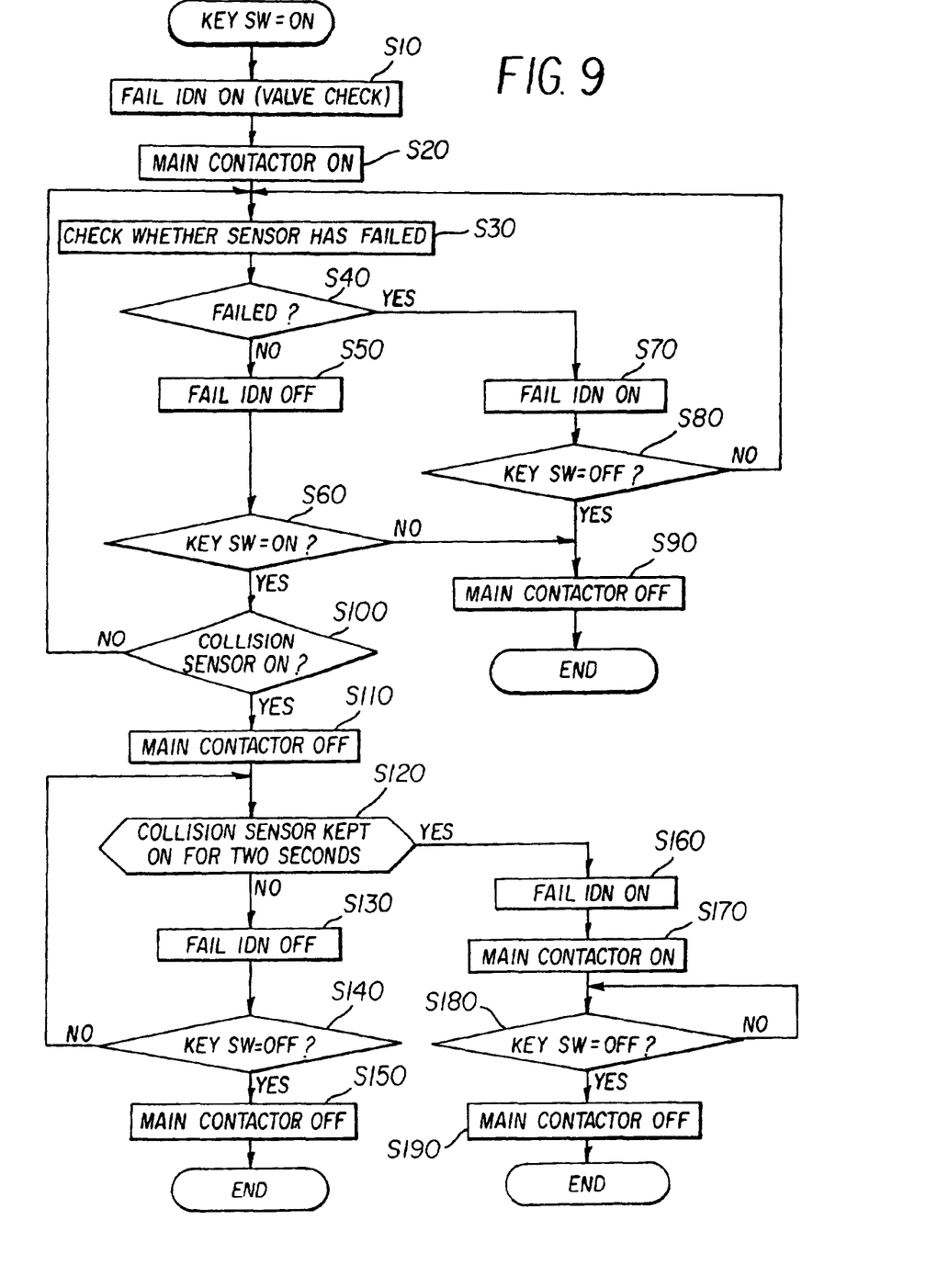
FIG. 9 is a flow chart showing operations of the high voltage system shut-off apparatus according to the fourth embodiment of the present invention.

With the above-described arrangement, the high voltage system shut-off apparatus of the motor vehicle according to the fourth embodiment of the present invention, which is constructed in the above-mentioned manner, controls the shut-off of the high voltage system as shown in FIG. 9, for example.

As shown in FIG. 9, in response to turning-on of a key switch of drive unit of the motor vehicle, the power supply shut-off control fail indicator 410 is turned on (step S10), and the main contactor 403 is turned on (step S20).

The process then proceeds to a step S30 wherein it is checked whether the collision sensor 411 has failed or not (i.e. a determination signal from the failure determination device 414 is captured). According to the determination signal from the failure determination section 414, it is determined whether the collision sensor 411 has failed (shut off down) or not (step S40).

If it is determined that the collision sensor 411 has not failed, the fail indicator 410 is turned off (step S50) and it is determined whether the key switch is ON or not (step S60). If it is determined that the key switch is ON, the process proceeds to a step S100, and if it is determined that the key switch is OFF, the process proceeds to a step S90 wherein the main contactor 403 is turned off to terminate the control.

On the other hand, if it is determined that the collision sensor 411 has failed, the fail indicator 10 is turned on or kept on (step S70) and it is determined whether the key switch is OFF or not (step S80). If it is determined that the key switch is ON, the process returns to the step S30 upon elapse of a predetermined period of time (control cycle). If it is determined that the key switch is OFF, the process proceeds to the step S90 wherein the main contactor 403 is turned off to terminate the control.

In the step S100, it is determined whether the collision sensor 411 is ON or not, i.e. whether the collision sensor 411 is outputting the collision detection signal or not. If it is determined that the collision sensor 411 is OFF (i.e. the collision sensor 411 is not outputting the collision detection signal), the process returns to the step S30 upon elapse of a predetermined period of time (control cycle). If it is determined that the collision sensor 411 is ON (i.e. the collision sensor 411 is outputting the collision detection signal), the process proceeds to a step S110 wherein the main contactor 403 is off, and the process then proceeds to a step S120.

In the step S120, it is determined whether the collision sensor 411 has been kept ON for a predetermined period of time (in this example, two seconds) or not. If the collision sensor 411 has not been kept for the predetermined period of time, it is determined that the collision sensor 411 has not failed. The fail indicator 410 is then turned off (step S130) and it is determined whether the key switch is OFF or not (step S140). If it is determined that the key switch is ON, the process returns to the step S120 upon elapse of a predetermined period of time (control cycle), and if it is determined that the key switch is OFF, the process proceeds to a step S150 wherein the main contactor 403 is turned off to terminate the control.

On the other hand, if the collision sensor 411 has been kept ON for the predetermined period of time, it is determined that the collision sensor 411 has failed, and the fail indicator 410 is turned on (step S160). The main contactor 403 is turned on (step S170), and it is determined whether the key switch is OFF or not (step S180). If it is determined that the key switch is ON, the process returns to the step S180 upon elapse of a predetermined period of time (control cycle), and if it is determined that the key switch is OFF, the process proceeds to a step S190 wherein the main contactor 403 is turned off to terminate the control.

Specifically, if the collision sensor 411 is switched from the OFF state to the ON state in a certain control cycle, the timer starts counting an elapsed time. The counting is continued insofar as the collision sensor 411 is not turned off. If the collision sensor 411 has been turned on without fail in response to the actual collision of the motor vehicle, the collision sensor 411 outputs an ON signal only a short period of time when the motor vehicle collides, and the collision sensor 411 is then turned off. Therefore, the collision sensor 411 is not kept ON for the predetermined period of time, and until the key switch is turned off, the fail indicator 410 is kept OFF in the step S130.

On the other hand, if the collision sensor 411 is turned on due to the failure, it is kept ON thereafter. Thus, if the collision sensor 411 has been kept ON for a sufficiently longer period of time (in this example, two seconds) than a period of time in which a greater deceleration than a predetermined value occurs in collision, it is determined that the collision sensor 411 has failed, and the fail indicator 410 is turned on (step S160). The main contactor 403 is then turned on (step S170), and the fail indicator 410 is kept ON and the main contactor is kept ON until the key switch is turned off.

If the collision sensor 411 has failed as mentioned above, the key switch is turned off and then turned on. After carrying out the process in the steps S10 and S20, the fail indicator 410 is turned on, and the main contactor 403 is turned on. The process then proceeds to the step S30 wherein it is determined that the collision sensor 411 has failed. The process then proceeds to the step S70 wherein the fail indicator 410 is kept ON and the main contactor 403 is kept ON.

Therefore, the fail indicator 410 and the main contactor 403 are kept ON until it is determined in the step S80 that the key switch is OFF.

As described above, if the collision sensor 411 is normal, a collision of the motor vehicle is detected according to an output from the collision sensor 411 to shut off the high voltage power supply. This prevents vehicle fire, electrifying shock, and makes is possible to smoothly cope with the accident.

If the collision sensor 411 has failed, the fail indicator 410 is turned on to inform a driver or the like of the fact that the collision sensor 411 has failed, while the main contactor 403 is kept on to surely enable the vehicle to run.

In particular, according to the present embodiment, if the collision sensor 411 outputs the collision detection signal, the main contactor 403 is turned off based on the assumption that the collision sensor 411 is normal before it is determined whether the collision detection signal results from the failure of the collisions sensor 411 (i.e. the collision detection signal does not result from a collision of the vehicle). Therefore, the high voltage power supply is shut off immediately after the vehicle collides with the collision sensor 411 being normal. This prevents vehicle fire, electrifying shock, and the like.

The failure determination section 414 determines that the collision sensor 411 has failed if the collision sensor 411 has outputted the collision detection signal for a predetermined period of time, the high voltage system breaking and connection control device 415 provides control of current-carrying such that the main contactor 403 is brought into the ON state again to reconnect the broken circuit of the high voltage power supply 402.

On this occasion, the failure determination section 414 determines whether the collision detection signal results from the failure of the collision sensor 411 in an appropriate determination time (e.g. two seconds). Therefore, if the collision sensor 411 has failed, the period of time (determination time) in which the driving power for running is lost is reduced as much as possible to prevent the running of the motor vehicle from being obstructed, while it is clearly determined whether the collision detection signal results from a collision of the motor vehicle or a failure of the collision sensor 411.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A motor vehicle driven by a motor run by power, comprising:

a feeding circuit breaking and connecting device provided in a feeding circuit that provides a power supply to a motor, for breaking and connecting the feeding circuit;

a collision detecting device for detecting a collision of said motor vehicle;

a failure determination device that determines a failure of said collision detecting device; and a high voltage system shut-off control device for controlling said feeding circuit breaking and connecting device to break the feeding circuit in response to said collision detecting device detecting a collision of said motor vehicle, and to restore the connection of the feeding circuit in response to said failure determination device determining that said collision detecting device failed.

2. A motor vehicle according to claim 1, wherein:

said collision detecting device outputs a collision signal if a deceleration of said motor vehicle has become equal to or greater than a predetermined value.

3. A motor vehicle according to claim 1, wherein:

said collision detecting device is a collision detecting device for an air bag provided in said motor vehicle.

4. A motor vehicle according to claim 1, wherein:

if said collision detecting device has output the collision detection signal for a predetermined period or longer, said failure determination device determines that said collision detection signal failed.

5. A motor vehicle according to claim 4, further comprising:

a failure indicating device that informs a driver of a failure of said collision detecting device upon said collision detecting device failing.

6. A motor vehicle according to claim 4, wherein said collision detection signal is output to said high voltage system shut-off control device if a deceleration of said motor vehicle has become equal to or greater than a predetermined value.

7. A motor vehicle according to claim 6, wherein said predetermined period is set longer than a period in which a larger deceleration of not less than said predetermined value is assumed to occur during a collision.

8. A method of controlling supply of power to a motor of a motor vehicle that is driven by the motor run by power, comprising the steps of:

detecting a collision of said motor vehicle with a collision detecting device;

breaking a feeding circuit to the motor with a feeding circuit breaking and connecting device upon detecting a collision of said motor vehicle;

determining whether a collision signal from said collision detecting device is false; and controlling the feeding circuit breaking and connecting device to restore the connection of said feeding circuit if the collision signal from said collision detecting device is false.

9. A method according to claim 8, wherein:

the collision signal is false when the collision detecting device fails, whereupon the power supply to said motor is restored.

* * * * *